United States Patent [19]

Lyall et al.

[11] Patent Number: 4,943,706
[45] Date of Patent: Jul. 24, 1990

[54] METHOD AND APPARATUS FOR FUSING THERMOPLASTIC MATERIALS

[75] Inventors: Lucian H. Lyall, Woodland Hills; Karol Z. Renau, Calabasas, both of Calif.

[73] Assignee: R. W. Lyall & Company, Inc., Santa Fe Springs, Calif.

[21] Appl. No.: 182,406

[22] Filed: Apr. 18, 1988

[51] Int. Cl.⁵ .............................................. H05B 1/02
[52] U.S. Cl. ...................................... 219/494; 219/497; 219/501; 219/505; 219/535; 219/544; 285/41; 156/274.2
[58] Field of Search ............... 219/492, 494, 497, 499, 219/501, 212, 528, 522, 535, 544; 285/21, 31, 41, 286; 156/273.9, 274.2, 64, 294

[56] References Cited

U.S. PATENT DOCUMENTS

| | | | |
|---|---|---|---|
| 2,972,780 | 2/1961 | Boonstra | 18/55 |
| 3,311,303 | 3/1967 | Noyes | 236/46 |
| 3,345,439 | 10/1967 | Everard et al. | 264/26 |
| 3,378,672 | 4/1988 | Blumenkranz | 219/200 |
| 3,465,126 | 9/1969 | Blumenkranz | 219/535 |
| 3,506,519 | 4/1970 | Blumenkranz | 156/275 |
| 3,548,155 | 12/1970 | Rabindran | 219/501 |
| 3,788,928 | 1/1974 | Wise | 156/274.2 X |
| 3,789,190 | 1/1974 | Orosy et al. | 219/497 |
| 3,800,123 | 3/1974 | Maans | 219/407 |
| 3,812,323 | 5/1974 | Pink | 156/158 |
| 3,851,148 | 11/1974 | Schonert et al. | 219/503 |
| 3,901,437 | 8/1975 | Harkins | 219/492 |
| 3,946,200 | 3/1976 | Juodikis | 219/497 |
| 3,969,170 | 7/1976 | Landgraf | 219/535 |
| 4,031,352 | 6/1977 | Oosterberg | 219/505 |
| 4,091,266 | 5/1978 | Ito et al. | 219/501 |
| 4,109,134 | 8/1978 | Van Herten | 219/501 |
| 4,117,311 | 9/1978 | Sturm | 219/492 |
| 4,138,607 | 2/1979 | Engelmann | 219/497 |
| 4,238,670 | 12/1980 | Maitenaz | 219/413 |
| 4,277,640 | 7/1981 | Kutnyak et al. | 174/47 |
| 4,334,146 | 6/1982 | Sturm | 219/544 |
| 4,375,591 | 3/1983 | Sturm | 219/544 |
| 4,416,713 | 11/1983 | Brooks | 219/535 |
| 4,436,988 | 3/1984 | Blumenkranz | 219/544 |
| 4,486,648 | 12/1984 | Grasso | 219/507 |
| 4,511,789 | 4/1985 | Goessler et al. | 219/446 |
| 4,525,233 | 6/1985 | Brooks | 156/64 |
| 4,571,488 | 2/1986 | Reeves | 219/544 |
| 4,602,148 | 7/1986 | Ramsey | 219/535 |
| 4,701,598 | 10/1987 | Cooper | 219/535 |
| 4,705,937 | 11/1987 | Marek | 219/535 |
| 4,718,698 | 1/1988 | Hill | 285/21 |

FOREIGN PATENT DOCUMENTS

| | | |
|---|---|---|
| 0067621 | 12/1982 | European Pat. Off. |
| 0149410 | 7/1985 | European Pat. Off. |
| 0437755 | 11/1965 | Switzerland |
| 0529628 | 10/1972 | Switzerland |
| 143282 | 1/1961 | U.S.S.R. |
| 1373761 | 11/1974 | United Kingdom |
| 2090558 | 7/1982 | United Kingdom |

*Primary Examiner*—M. H. Paschall
*Attorney, Agent, or Firm*—Fulwider, Patton, Lee & Utecht

[57] ABSTRACT

An apparatus and method for attaining fusion temperature at substantially the same time throughout an interface between thermoplastic articles by the controlled application of heat. The method includes providing a sensed temperature signal corresponding with the temperature at the interface, generating a desired temperature signal (such as an analog ramp signal which increases linearly with time) corresponding with a predetermined heat application rate which causes the temperature at substantially all portions of the interface to rise substantially uniformly, providing a heat control signal corresponding with any difference between said signals, and applying heat to the interface at a rate determined by the heat control signal to achieve fusion temperature throughout the interface at the same time. The apparatus includes a heater coil to apply heat to the interface, a sensor to provide the sensed temperature signal, a generator to provide the desired temperature signal, and a differential amplifier to provide the heat control signal. Fault detection circuits stop the process if a heater fault, a temperature sensor fault, or a power supply fault is detected. Testing circuits are included to test the apparatus for proper operation before commencing fusion.

11 Claims, 7 Drawing Sheets

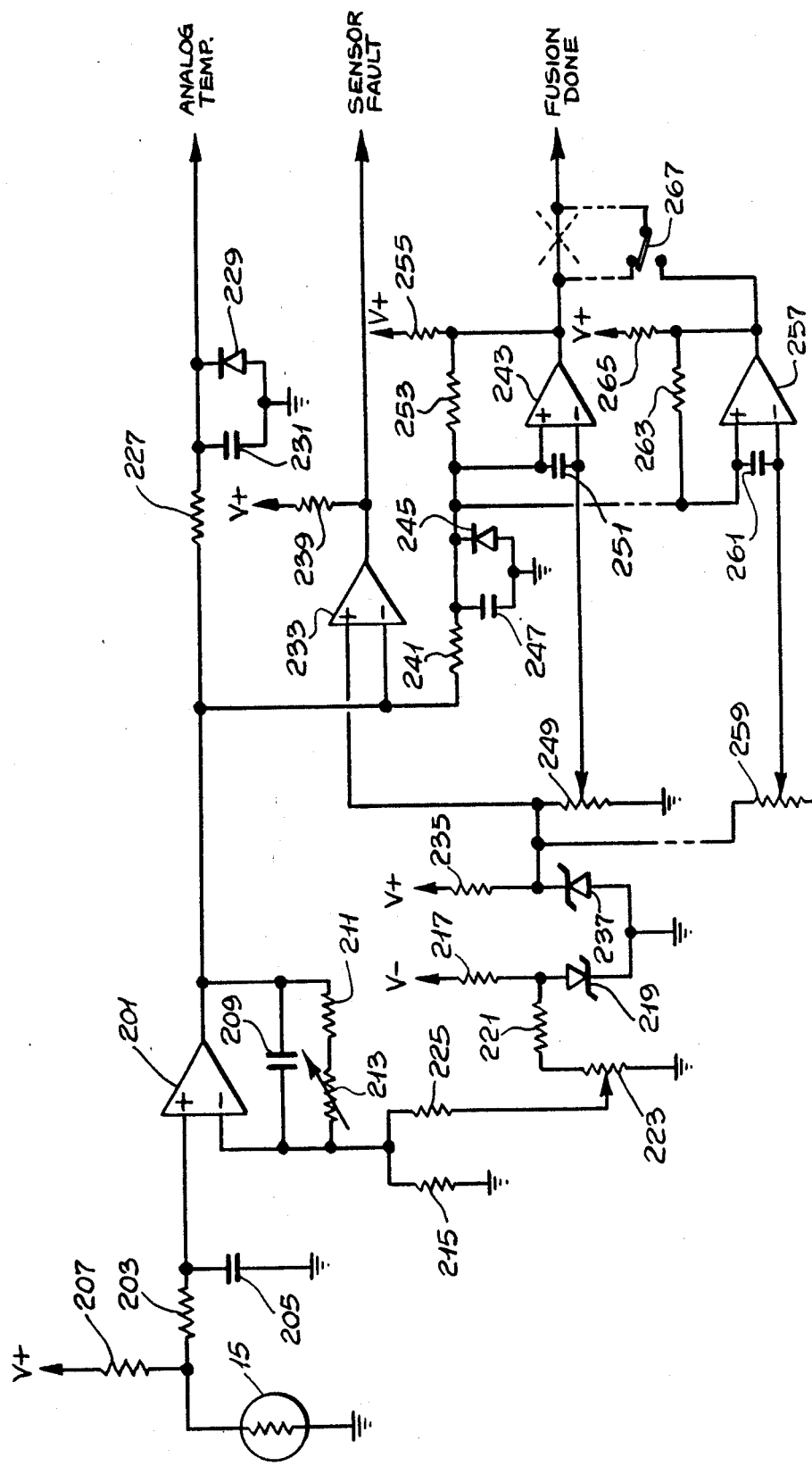

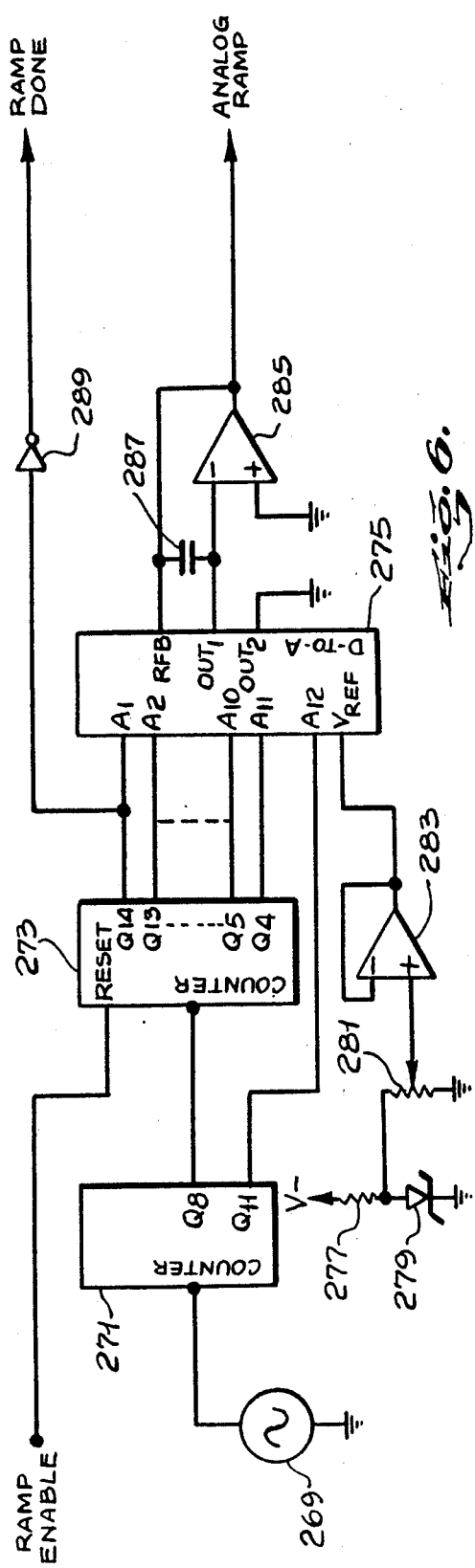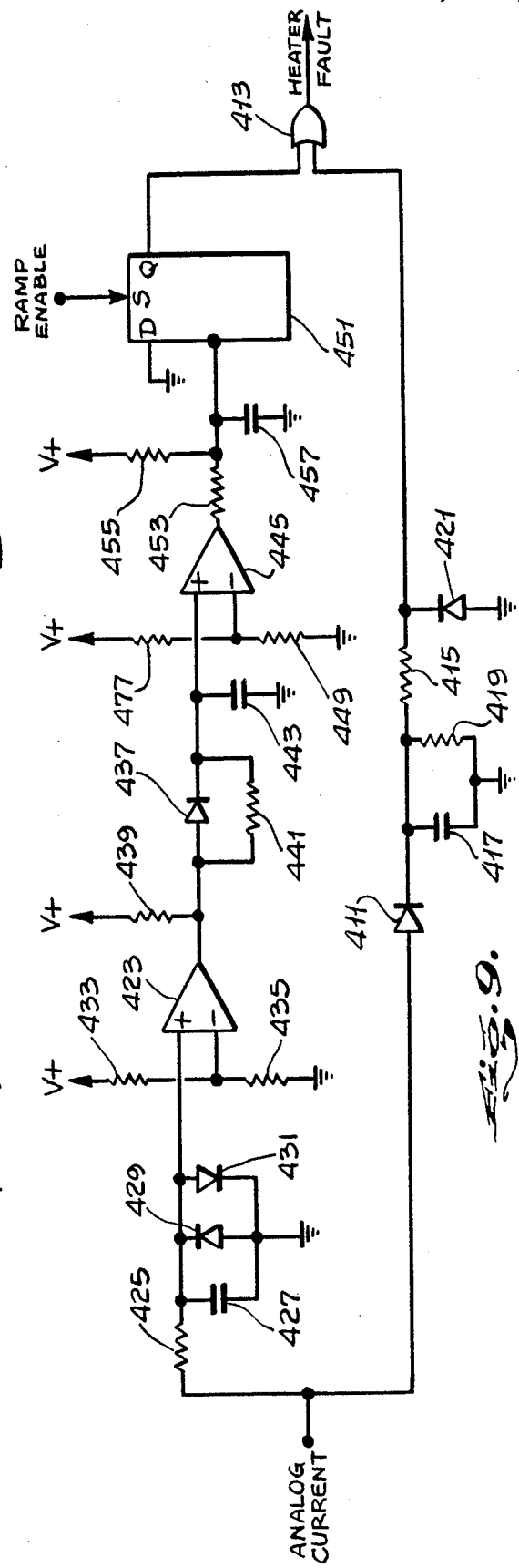

METHOD AND APPARATUS FOR FUSING THERMOPLASTIC MATERIALS

BACKGROUND OF THE INVENTION

The present invention relates generally to an apparatus and method for the controlled application of heat to develop a predetermined temperature for fusing items made of thermoplastic material.

It is known to fuse thermoplastic pipes together by means of a cylindrical thermoplastic coupling containing a heating coil. The pipes are inserted into the coupling, defining an interface between the pipes and the coupling. The coil is energized, providing heat which raises the temperature of the pipes and the coupling at the interface to a temperature that is high enough to fuse the coupling and the pipes together.

The heat must be applied for a sufficient time to raise the temperature throughout the interface to the fusion temperature so as to fuse the pipes and the coupling into a mechanically strong, leakproof connection. If not enough heat is applied, portions of the interface will never reach the fusion temperature and the fusion will be incomplete, resulting in a leaky connection. Conversely, if too much heat is applied, the heat will diffuse all the way through the pipes and melt them. In addition, if the heat is applied at too great a rate, hot spots will occur in the thermoplastic material adjacent the heating coil, resulting in localized melting of the thermoplastic, short circuits between adjacent turns of the coil, and possibly fire. Consequently, it is necessary to precisely control the application of heat so that just enough heat is applied at a sufficiently rapid rate to raise the temperature of the pipes and the coupling throughout the interface to the fusion temperature at substantially the same time without melting the pipes or causing hot spots.

The amount of heat which must be applied is a function of the ambient temperature. Non-uniform heat diffusion is a particular problem when the ambient temperature is low, as in winter. In addition, the required amount of heat is also a function of the diameter of the pipes, more heat being required if the pipes are large than if they are small.

Accordingly, there is a need for a way to control the rate of application of heat so as to attain fusion temperature at substantially the same time throughout an interface between thermoplastic materials without damaging the materials.

SUMMARY OF THE INVENTION

The present invention provides an apparatus and method for attaining fusion temperature at substantially the same time throughout an interface between thermoplastic materials by the controlled application of heat. The heat is applied at a rate determined by any difference between a desired temperature signal corresponding with a predetermined heat application rate and a sensed temperature signal corresponding with the temperature at the interface.

A method according to the invention includes sensing the temperature at the interface and providing a sensed temperature signal corresponding therewith, generating a desired temperature signal corresponding with a predetermined heat application rate which causes the temperature at substantially all portions of the interface to rise substantially uniformly, providing a heat control signal corresponding with any difference between the sensed and desired temperature signals, and applying heat to the interface at a rate determined by the heat control signal whereby fusion temperature is attained throughout the interface substantially simultaneously.

Apparatus according to the invention includes heater means to apply heat to the interface between the articles to be fused, sensor means to provide the sensed temperature signal corresponding with the temperature at the interface, generator means to provide the desired temperature signal corresponding with the predetermined heat application rate, and differential means to provide the heat control signal corresponding with any difference between the sensed and desired temperature signals.

In a preferred embodiment the desired temperature signal comprises a ramp signal. Optionally the heat control signal is adjustable according to the size of the articles to be fused. Fault detection means monitors the sensor means and the heater means during fusion and terminates the fusion if a fault is detected. Preferably the fault detection means also monitors electric power received from an external source and terminates the fusion if a power fault is detected. Test means is provided to test the sensor means and the heater means for proper operation prior to commencement of the fusion.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 5 is a schematic diagram of the "temperature sense" block of FIG. 1;

FIG. 6 is a schematic diagram of the "ramp generator" block of FIG. 1;

FIG. 9 is a schematic diagram of the "current sense" block of FIG. 1; and

DESCRIPTION OF THE PREFERRED EMBODIMENT

Figure 1:
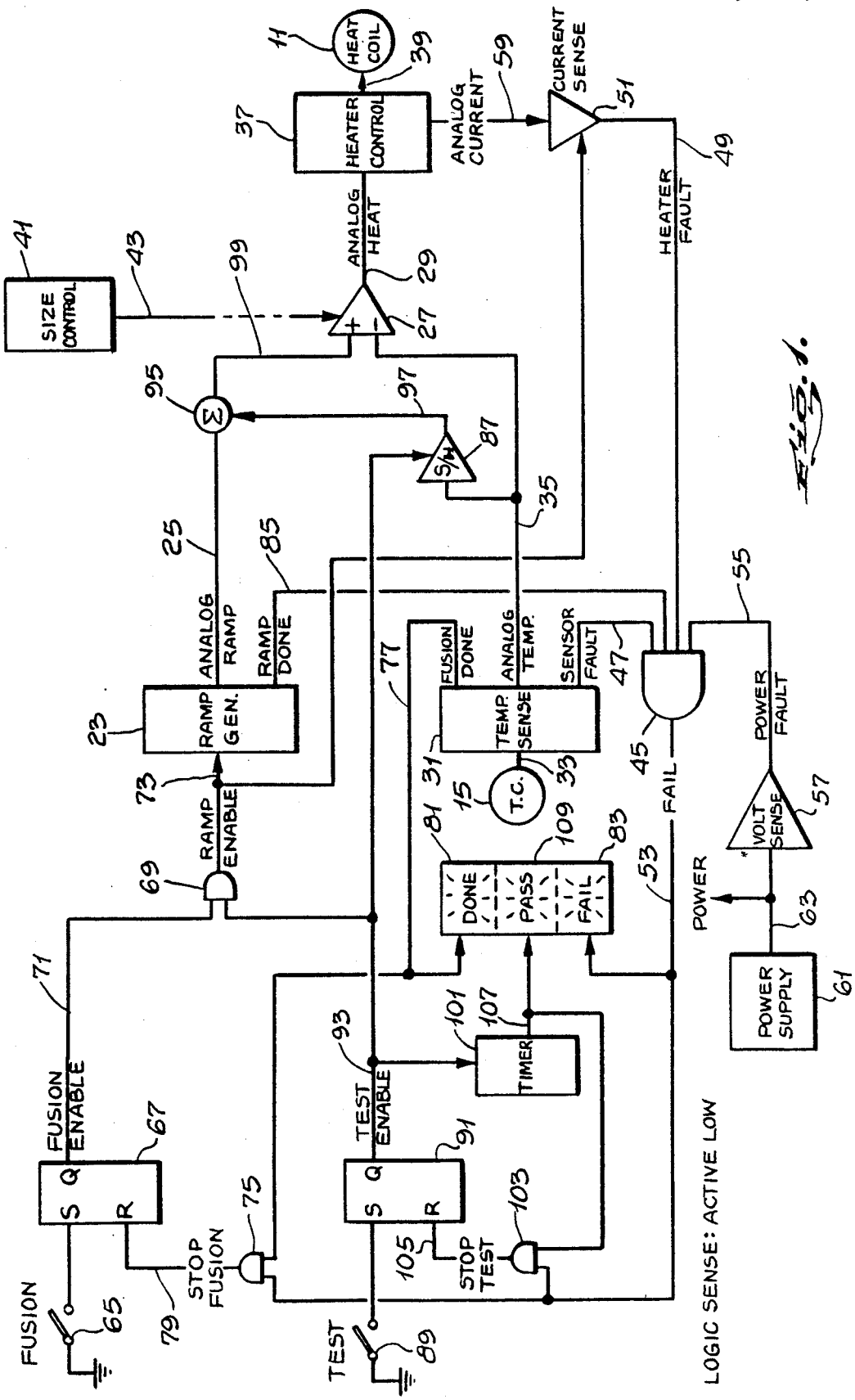
FIG. 1 is a block diagram of a preferred embodiment of fusion control apparatus according to the invention.

As shown in the drawings for purposes of illustration, the invention is embodied in a novel apparatus and method for fusing thermoplastic materials by the controlled application of heat to an interface between the articles to attain fusion temperature throughout the interface substantially simultaneously. The application of heat at a fixed or uncontrolled rate results in incomplete fusion if too little heat is applied or in overheating and melting of the materials if too much heat is applied, problems which have been particularly troublesome when conducting fusion under extreme conditions of ambient temperature.

In accordance with the invention, heat is applied to the interface between the articles to be fused at a rate determined by the difference between the sensed temperature at the interface and a desired temperature corresponding with a predetermined heat application rate. When the heat is controlled in this way, fusion temperature is attained throughout the interface at substantially the same time, consistently resulting in mechanically strong, leakproof connections regardless of the ambient temperature.

Figure 2:
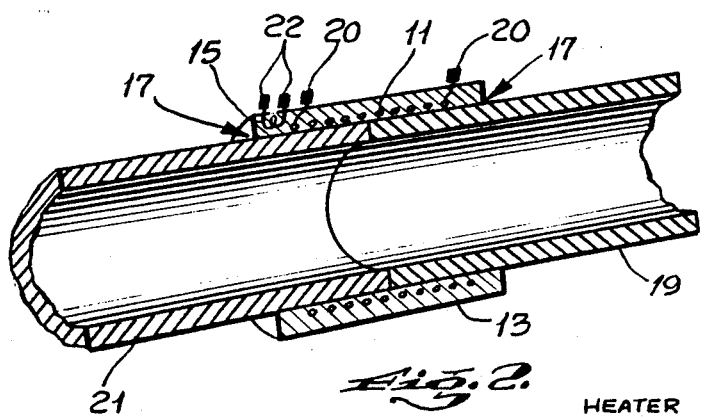
FIG. 2 is a sectional perspective view of a pair of thermoplastic pipes in abutting relationship for fusing within a thermoplastic coupling having a heating element and a temperature sensor and adapted for use with the apparatus of FIG. 1.

More particularly, the invention is embodied in fusion control means as illustrated in block diagram form in FIG. 1 for controlling fusion apparatus such as the apparatus shown illustratively in FIG. 2.

The fusion apparatus includes heater means such as a heating coil 11 embedded in a thermoplastic coupling 13 and sensor means such as a thermocouple 15 also embedded in the coupling 13. The heating coil 11 applies heat to an interface 17 between articles made of thermoplastic material such as the coupling 13 and pipes 19 and 21 which have been inserted into the coupling 13 from opposite ends thereof to raise the temperature at the interface 17 sufficiently to fuse the articles together. The thermocouple 15 provides a sensed temperature signal corresponding with the temperature at the interface 17.

The heating coil 11 receives electrical power through, for example, a pair of connector pins 20 which are mounted on the coupling 13 to receive quick-disconnect mating connectors (not shown) which carry power for the heating coil 11. Similarly, electrical connection with the thermocouple 15 is provided through a pair of connector pins 22 also mounted on the coupling 13 and preferably sized differently from the pins 20 to prevent any inadvertent misconnection. It will be apparent that other methods of connection such as wireless or infrared communication could also be used.

The fusion control means includes generator means such as a ramp generator 23 operative to provide a desired temperature signal such as an analog ramp signal (a "ramp signal" is a signal that increases linearly with time) on a line 25 corresponding with a predetermined heat application rate which causes the temperature at substantially all portions of the interface 17 to rise substantially uniformly, and differential means such as a differential amplifier 27 operative to provide a heat control signal such as an analog heat signal on a line 29 corresponding with any difference between the sensed and desired temperature signals, the heater means being operative to apply heat to the interface 17 at a rate determined by the heat control signal whereby fusion temperature is attained throughout the interface 17 substantially simultaneously.

The sensed temperature signal from the thermocouple 15 is preferably applied to a temperature sense circuit 31 on a line 33 to obtain an analog temperature signal which is provided to a negative input of the amplifier 27 on a line 35. The analog heat signal from the amplifier 27 is preferably applied to a heater control circuit 37 to control the application of electric power to the heater coil 11 through a line 39.

Optional adjustment means such as a pipe size control 41 in communication with the amplifier 27 as indicated by a broken line 43 adjusts the heat control signal according to the size of the articles to be fused.

Fault detection means such as a logic circuit 45 monitors the sensor means and the heater means during fusion and terminates the fusion if a fault is detected. The logic circuit 45, depicted as an AND gate, receives a sensor fault signal on a line 47 from the temperature sense circuit 31 and a heater fault signal on a line 49 from a current sense circuit 51, and upon receiving either signal provides a "failure" signal on a line 53 to terminate the fusion.

The logic sense of the circuit 45 and other logic devices depicted in FIG. 1 is active low; that is, a logical "true" is represented by a LO signal level and a logical "false" is represented by a HI signal level. Thus, a HI level on all inputs to the circuit 45 indicates that no fault conditions are detected; a LO level on any input indicates a fault condition and causes a LO level on the output, which indicates that a failure has occurred.

Electric power to operate the fusion apparatus and the fusion control means is generally provided by an external power source such as commercial A.C. power. However, if commercial power is not available (which is usually the case when performing fusion in the field) the power source consists of a portable generator or the like, and power from such portable sources is subject to wide voltage fluctuations. Such fluctuations can interfere with proper fusion, and therefore the fault detection means preferably monitors the power during fusion and terminates the fusion if a power fault is detected. Accordingly, the logic circuit 45 receives a power fault signal on a line 55 from a voltage sense circuit 57 and terminates the fusion if such a signal is received.

The current sense circuit 51 monitors the heater by means of an analog current signal provided by the heater control circuit 37 on a line 59. The voltage sense circuit 57 monitors the power as provided by a power supply 61 on a line 63.

Fusion is initiated by closure of a "fusion start" button 65, which momentarily applies a LO signal level to a "set" input of a latch 67. This in turn causes a "fusion enable" signal to appear at a "Q" output of the latch 67. The fusion enable signal is applied to an AND gate 69 through a line 71. The AND gate 69 in turn provides a "ramp enable" signal which is applied to the ramp generator 23 through a line 73 to start the ramp and thereby initiate fusion. The manner in which the analog ramp signal controls the initiation of fusion, and the manner in which the heater current is controlled by the analog ramp and temperature signals, will be discussed in more detail in a subsequent paragraph.

The ramp enable signal is also applied to the current sense circuit 51 to enable it to monitor the operation of the heater coil 11.

Completion of the fusion is indicated by a "fusion done" signal which is generated by the temperature sense circuit 31 when fusion temperature has been reached. This signal is applied to an AND gate 75 through a line 77. Upon receiving the fusion done signal, the AND gate 77 provides a "stop fusion" signal to a "reset" input of the latch 67 through a line 79, resetting the latch 67. When the latch 67 has been reset, the fusion enable signal vanishes, shutting off the ramp generator 23 and thereby interrupting power to the heater coil 11.

The fusion done signal is also provided to an indicator 81 to indicate that fusion has been completed.

If a fault is detected during fusion, the failure signal is provided by the logic circuit 45. The failure signal is applied to the AND gate 75 to generate the "stop fusion" signal which stops the fusion as already described. The failure signal is also provided to an indicator 83 to indicate that a failure has occurred.

If fusion temperature has not been reached by the time the ramp signal has reached a maximum value, the fusion has failed. Accordingly, if the ramp reaches its maximum value prior to completion of the fusion, a "ramp done" signal is provided by the ramp generator 23 on a line 85 to the logic circuit 45 to indicate that a failure has occurred Test means such as a sample-and-hold ("S&H") circuit 87 allows the sensor means and the heater means to be tested for proper operation prior to commencement of the fusion. The test sequence is initiated by closure of a "test" button 89, which momentarily applies a LO signal level to a "set" input of a latch 91. This in turn causes a "test enable" signal to appear at a "Q" output of the latch 91. The test enable signal is applied to the S&H circuit 87 through a line 93, enabling the S&H circuit 87 to apply the analog temperature signal from the line 35 to a summation point 95 through a line 97. The summation point 95 also receives the analog ramp signal from the line 25 and provides the sum of these signals to a positive input of the amplifier 27 through a line 99.

The amplifier 27 provides no analog heat signal unless the signal at its positive input, as provided on the line 99, is at least as great as the signal at its negative input, as provided on the line 35. Thus, in order to obtain an analog heat signal with which to test for proper heater operation without having to wait for the ramp signal to reach a sufficiently high value, the analog temperature signal is summed with the ramp signal to provide a signal on the line 99 which is at least as great as that being provided on the line 35. This results in a small analog heat signal being provided by the amplifier 27, and this in turn results in the application of relatively low power to the heater coil 11.

The test enable signal is also applied to the AND gate 69 to generate the ramp enable signal to start the ramp generator and enable the current sense circuit.

It will thus be apparent that pressing the test button 89 immediately applies low power to the heating coil. If a fault is detected in the thermocouple 15, the heater coil 11, or the power supply voltage, a failure signal will be provided by the logic circuit 45 just as if such a fault had been detected during the fusion process itself.

The test enable signal is also applied to a timer 101. In response, the timer 101 commences timing for any convenient test interval, say ten seconds. If during this interval a fault is detected, the failure signal is generated and applied to the indicator 83 to show that the test has been failed.

The failure signal is also applied to an AND gate 103 through the line 53. Upon receiving the failure signal, the AND gate 103 provides a "stop test" signal to a "reset" input of the latch 91 through a line 105, resetting the latch 91 and thereby stopping the test by shutting off the test enable signal and in turn disabling the timer 101 and the S&H 87 and resetting the ramp generator 23.

If the test interval elapses without detection of any fault, the timer 101 provides a "pass" signal on a line 107.

The pass signal is applied to an indicator 109 to indicate that the test has been passed and to the gate 103 to rest the latch 91 and end the test.

From the above discussion it will be apparent that the method of the invention comprises the steps of sensing the temperature at the interface between the articles to be fused and providing a sensed temperature signal corresponding with the temperature, generating a desired temperature signal corresponding with a predetermined heat application rate which causes the temperature at substantially all portions of the interface to rise substantially uniformly, providing a heat control signal corresponding with any difference between the sensed and desired temperature signals, and applying heat to the interface at a rate determined by the heat control signal whereby fusion temperature is attained throughout the interface substantially simultaneously.

The manner in which the desired temperature signal, such as the analog ramp signal as previously described, controls the initiation of fusion, and the manner in which the heater current is controlled by the analog ramp and temperature signals, will now be described with reference to FIGS. 3 and 4.

Figure 3:
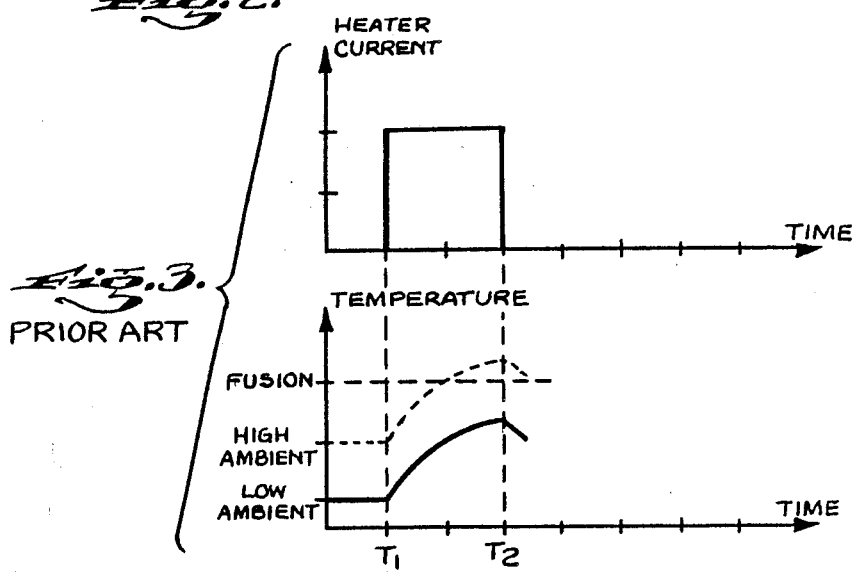
FIG. 3 is a graph showing a fixed rate of application of heat during fusion according to the prior art.

The result of applying heat for the fusion of thermoplastic articles according to the prior art is depicted graphically in FIG. 3. A fixed amount of heater current is applied to the heater at a time T1 and continues to flow until a later time T2 as shown in the upper graph of FIG. 3.

If the articles being fused are initially at a low ambient temperature (such as −10 degrees Fahrenheit on a cold winter day), the heater raises their temperature but, as shown by a solid curve in the lower graph of FIG. 3, they do not reach fusion temperature by the time the heater current is shut off. The result is incomplete fusion and a mechanically weak connection.

Conversely, if the articles being fused are initially at a high ambient temperature (such as +95 degrees Fahrenheit), the heater not only raises their temperature but, as shown by a dotted curve in the lower graph of FIG. 3, they exceed fusion temperature while the heater is still operating. The result is melting and physical damage.

In addition, regardless of the ambient temperature the abrupt application of heater current causes hot spots in the plastic near the heater coil, and this in turn can result in localized melting, shorting of the heater coil wires, and fire.

Figure 4:
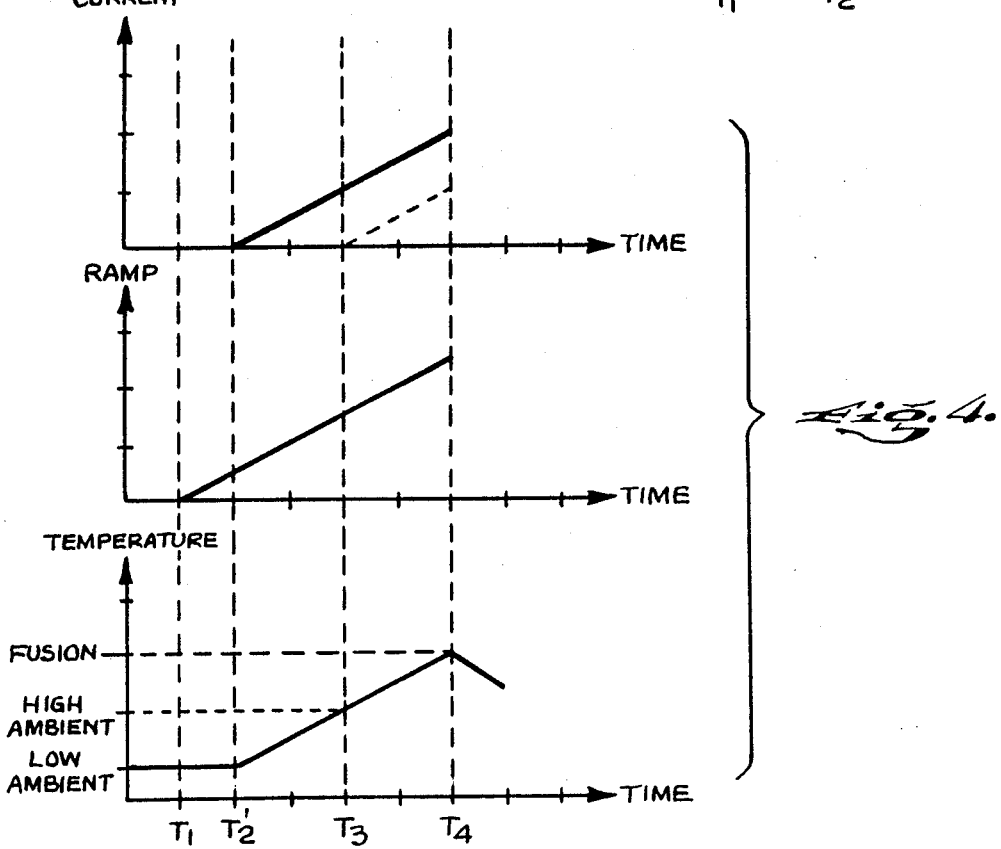
FIG. 4 is a graph showing a controlled rate of application of heat during fusion according to the invention.

The application of heat according to the method of the invention is depicted graphically in FIG. 4.

Fusion is initiated at a time T1 as indicated by the commencement of the ramp signal, shown by the curve in the middle graph of FIG. 4. However, no heater current is provided at this time. As the ramp increases, it eventually reaches a level equal to that of the ambient temperature of articles being fused; if the articles are initially at a low ambient temperature, as shown by a solid curve in the lower graph of FIG. 4, this occurs at a time T2.

When the level of the ramp reaches the level of the ambient temperature, heater current commences as indicated by a solid curve in the upper graph of FIG. 4. The heater current increases generally linearly as the ramp increases until fusion temperature is reached at a time T4, at which time the ramp is shut off, terminating the heater current.

It will be remembered that the heater current is determined by any difference between the ramp (middle graph of FIG. 4) and the sensed temperature at the interface (lower graph of FIG. 4). If the sensed temperature rises more slowly than the ramp, a larger heater current will be provided, resulting in more heat output which will tend to raise the interface temperature at the desired rate. Conversely, if the interface temperature rises faster than expected, the heater current will be reduced, resulting in less heat output which, again, will tend to cause the interface temperature to rise only at the desired rate.

If the articles are at a high ambient temperature as indicated by a dotted curve in the lower graph of FIG. 4, the ramp will not have reached a level equal to that temperature at time T2 and hence no heater current will flow. Instead, the level of the ramp reaches the level of the ambient temperature at a later time T3, and heater current commences as indicated by a dotted curve in the upper graph of FIG. 4. The heater current increases generally linearly as the ramp increases until fusion temperature is reached at a time T4, at which time the ramp is shut off, terminating the heater current. It will be apparent from the graphs that, the higher the ambient temperature, the less total heat will be applied. It will also be apparent that the heater current is always shut off when the articles reach fusion temperature, not before or after.

Additionally, the heater current begins at a small value and increases smoothly, and therefore the heat diffuses uniformly through the interface without developing any hot spots and the problems attendant thereto.

From the foregoing it will be apparent that the application of fusion heat according to the method and apparatus of the invention consistently results in uniform, mechanically strong fusion throughout the interface between the articles being fused.

A more detailed description of the principal circuitry of the invention will now be provided. The temperature sense block 31 of FIG. 1, as shown schematically in FIG. 5, includes an amplifier 201 having a positive input connected to a first terminal of the thermocouple 15 through a resistor 203. A bypass capacitor 205 is connected between the positive input and ground. A bias resistor 207 is connected between the first terminal of the thermocouple 15 and a positive power supply connection designated "V+". A second terminal of the thermocouple 15 is connected to ground.

A feedback capacitor 209 is connected between an output of the amplifier 201 and a negative input thereof. A fixed resistor 211 and a variable resistor 213, which serves as an adjustable gain control, are connected in series across the capacitor 209. A resistor 215 is connected between the negative input and ground.

A resistor 217 is connected from an anode of a Zener diode 219 to a negative power supply connection designated "V−" and a cathode of the diode 219 is connected to ground, a negative reference voltage being thereby developed at the anode. A resistor 221 is connected from the anode to a first fixed terminal of a potentiometer 223. A second fixed terminal of the potentiometer 223 is connected to ground. A variable terminal of the potentiometer 223 is connected to the negative input of the amplifier 201 through a resistor 225 to provide an adjustable offset voltage.

The output of the amplifier 201 is connected to a first terminal of a resistor 227. A cathode of a diode 229 is connected to a second terminal of the resistor 227. An anode of the diode 229 is connected to ground. A capacitor 231 is connected across the diode 229. The analog temperature signal is provided at the second terminal of the resistor 227.

The output of the amplifier 201 is also connected to a negative input of a comparator 233. A resistor 235 is connected from a cathode of a Zener diode 237 to V+ and an anode of the diode 237 is connected to ground, a positive reference voltage being thereby developed at the cathode. A positive input of the comparator 233 is connected to the cathode of the diode 237 to receive this reference voltage. A resistor 239 is connected from an output of the comparator 233 to V+.

The sensor fault signal is provided at the output of the comparator 233. If there is an open circuit in any connection between the thermocouple 15 and the amplifier 201, the output of the amplifier 201 will become more positive than the reference voltage at the positive input of the comparator 233, resulting in a LO level at the output of the comparator 233 and thereby indicating a fault in the sensor circuit.

The output of the amplifier 201 is also connected through a resistor 241 to a positive input of a comparator 243. A cathode of a diode 245 is connected to the positive input of the comparator 243 and an anode of said diode is connected to ground. A capacitor 247 is connected across the diode 245.

A first fixed terminal of a potentiometer 249 is connected to the cathode of the Zener diode 237 and a second fixed terminal of the potentiometer 249 is connected to ground. A variable terminal of the potentiometer 249 is connected to a negative input of the comparator 243. A capacitor 251 is connected between the positive and negative inputs of the comparator 243. A resistor 253 is connected between an output of the comparator 243 and the positive input thereof. A resistor 255 is connected between the output of the comparator 243 and V+.

The comparator 243 provides the "fusion done" signal by comparing the output of the amplifier 201 with the reference voltage provided at the variable terminal of the potentiometer 249 to determine when the desired fusion temperature has been reached, and upon said temperature being reached the "fusion done" signal is provided.

Optionally, means may be provided to manually change the value of the temperature at which the "fusion done" signal is generated. For example, fusion of pipes having a diameter less than about three inches is complete when the temperature at the interface reaches 350 degrees Fahrenheit, whereas for pipes having a diameter between about three and eight inches the temperature should reach 390 degrees Fahrenheit before the "fusion done" signal is generated.

Accordingly, as indicated by broken lines in FIG. 5, a second comparator 257 has a positive input connected to the positive input of the comparator 243 and a negative input connected to a variable terminal of a second potentiometer 259. A first fixed terminal of the potentiometer 259 is connected to the first fixed terminal of the potentiometer 249 and a second fixed terminal of the potentiometer 259 is connected to ground. A capacitor 261 is connected between the positive and negative inputs of the comparator 257.

A resistor 263 is connected between an output of the comparator 257 and the positive input thereof. A resistor 265 is connected between the output of the comparator 257 and V+. A first contact of a single pole double throw switch 267 is connected to the output of the comparator 243 and a second contact of the switch 267 is connected to the output of the comparator 257. A pole of the switch 267 provides the "fusion done" signal from one or the other of the comparators 243 and 257 according to the setting of the switch. Each of the potentiometers 249 and 259 is adjusted for a different fusion temperature, and by means of the switch either temperature can be selected as the fusion temperature.

The values of the components used in the above-described circuit are not believed to be critical. The following components and component values have been found to provide satisfactory results (resistor values are in ohms and capacitor values are in microfarads unless otherwise indicated; K=1,000 and M=1,000,000):

| Ref. No. | Item | Identification or value |
|---|---|---|
| 201 | Amplifier | OP27 low noise op amp; Precision Monolithics |
| 203 | resistor | 1K |
| 205 | capacitor | 0.1 |
| 207 | resistor | 10 Meg |
| 209 | capacitor | 1.0 |
| 211 | resistor | 330K |
| 213 | pot | 10K |
| 215 | resistor | 1K |
| 217 | resistor | 1K |
| 219 | 6.9 v Zener | LM329Z, National Semiconductor |
| 221 | resistor | 10K |
| 223 | pot | 10K |
| 225 | resistor | 1 Meg |
| 227 | resistor | 1K |
| 229 | diode | 1N4148 |
| 231 | capacitor | 33 |
| 233 | comparator | LM339AN, National Semiconductor |
| 235 | resistor | 1K |
| 237 | Zener diode | same as #219 above |
| 239 | resistor | 3.3K |
| 241 | resistor | 10K |
| 243 | comparator | same as #233 above |
| 245 | diode | 1N4148 |
| 247 | capacitor | 10 |
| 249 | pot | 10K |
| 251 | capacitor | 0.1 |
| 253 | resistor | 1 Meg |
| 255 | resistor | 3.3K |
| 257 | comparator | same as #233 above |
| 259 | pot | 10K |
| 261 | capacitor | 0.1 |
| 263 | resistor | 1 Meg |
| 265 | resistor | 3.3K |

The ramp generator block 23 of FIG. 1, as shown schematically in FIG. 6, has an oscillator 269 which provides an alternating current to a clock input of a 14-stage binary counter 271 such as an RCA type CD4020B. An output of an eighth stage of the counter 271 is connected to a clock input of a similar binary counter 273. Outputs from a fourth stage of the counter 273 through a 14th stage of the counter 273, and an 11th-stage output of the counter 271, are connected to various digital inputs of a digital-to-analog converter ("DAC") 275 such as a Precision Monolithics type PM-7541.

A 1,000 ohm resistor 277 is connected between V— and an anode of a 6.9 volt Zener diode 279 such as a National Semiconductor type LM329. A cathode of the diode 279 is connected to ground. A first fixed terminal of a 10,000 ohm potentiometer 281 is connected to the anode and a second fixed terminal of the potentiometer is connected to ground. A variable terminal of the potentiometer 281 is connected to a positive input of an amplifier 283 such as a National Semiconductors type LM324AN. A negative input of the amplifier 283 is connected to an output thereof, and the output is connected to a reference input of the DAC 275.

A first output of the DAC 275 is connected to a negative input of an amplifier 285 such as an LM324AN. A second output of the DAC 275 and a positive input of the amplifier 285 are connected to ground. An output of the amplifier 285 is connected to an RFB input of the DAC 275 (an internal 10,000 ohm feedback resistor is connected between the RFB input and the first output). A 1.0 microfarad capacitor 287 is connected between the RFB input and the first output. The analog ramp signal is provided at the output of the amplifier 285.

The output of the 14th stage of the counter 273 is inverted through an inverting gate 289 to provide the "ramp done" logic signal.

It will be apparent that the component values in this circuit are not critical. Ramp generators may be fabricated from any of a number of commonly available components such as oscillators, binary counters and DACs. The oscillator may be implemented, for example, by an NE555 timer in a relaxation oscillator circuit. The components should be selected to cause the ramp output to increase linearly over a period of two or three minutes according to the rate at which it is desired to increase the temperature of the articles to be fused. The frequency of the oscillator may be put under manual control if it is desired to provide a plurality of rates of increase, for example according to the size of the articles to be fused.

Figure 7:
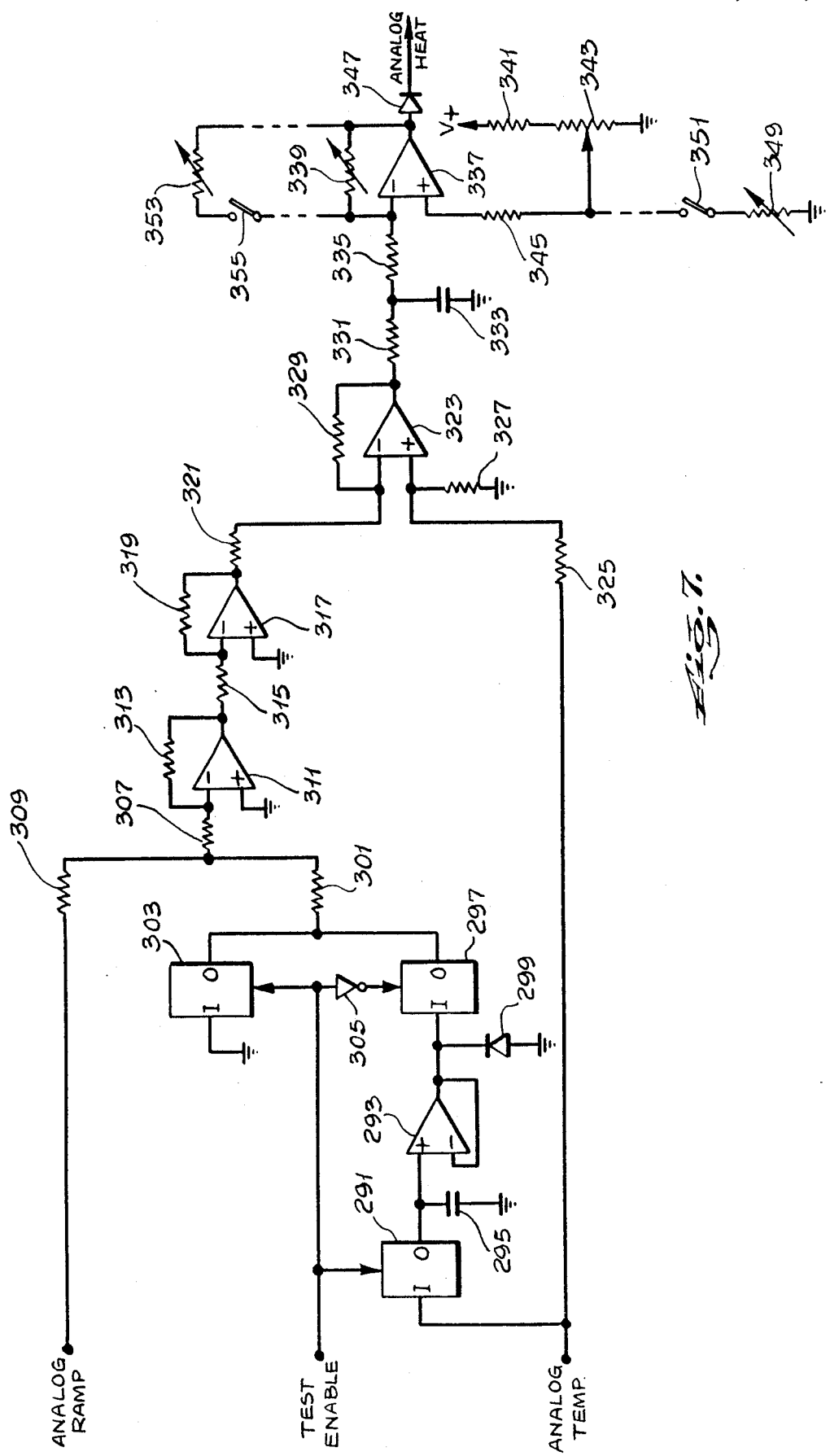
FIG. 7 is a schematic diagram of the sample-and-hold and differential amplifier blocks of FIG. 1.

The S&H, summation point, and differential amplifier 87, 95 and 27, respectively of FIG. 1 are depicted schematically in FIG. 7. The analog temperature signal is applied to an input of an analog switch 291. An output of the switch 291 is connected to a positive input of a sample-and-hold amplifier 293. A capacitor 295 is connected between said positive input and ground. An output of the amplifier 293 is connected to a negative input thereof, to an input of an analog switch 297, and to a cathode of a diode 299. An anode of the diode 299 is connected to ground. An output of the switch 297 is connected to a first terminal of a resistor 301. An input of an analog switch 303 is connected to ground and an output thereof is also connected to the first terminal of the resistor 301.

The test enable signal is applied to control inputs of the switches 291 and 303 and, through an inverting gate 305, to a control input of the switch 297. When the test enable signal is HI (test not being performed) the switches 291 and 303 are closed and the switch 305 is open, thereby applying the analog temperature signal to charge the capacitor 295 and grounding the first end of the resistor 301. When the test enable signal goes LO (test being performed) the three switches reverse their settings, effectively disconnecting the capacitor 295 from the analog temperature signal and connecting the first terminal of the resistor 301 to the output of the amplifier 293.

The analog ramp signal is applied to a first terminal of a resistor 307 through a resistor 309. A second terminal of the resistor 301 is also connected to the first terminal of the resistor 307 to define a summation point corresponding with the summation point 95 of FIG. 1. A second terminal of the resistor 307 is connected to a negative input of an amplifier 311. A positive input of the amplifier 311 is connected to ground. An output of the amplifier 311 is connected through a resistor 313 to the negative input thereof, and through a resistor 315 to a negative input of an amplifier 317. A positive input of the amplifier 317 is connected to ground. An output of the amplifier 317 is connected through a resistor 319 to the negative input thereof, and through a resistor 321 to a negative input of an amplifier 323.

The analog temperature signal is applied to a positive input of the amplifier 323 through a resistor 325. A resistor 327 is connected between ground and the positive input of the amplifier 323, and a resistor 329 is connected between the negative input and an output thereof.

A resistor 331 is connected between the output of the amplifier 323 and a first terminal of a capacitor 333. A resistor 335 is connected between the first terminal of the capacitor 333 and a negative input of an amplifier 337. A second terminal of the capacitor 333 is connected to ground. A variable resistor 339 is connected between the negative input of the amplifier 337 and an output thereof to provide a gain adjustment.

A resistor 341 is connected between V+ and a first fixed terminal of a potentiometer 343. A second fixed terminal of the potentiometer 343 is connected to ground and a variable terminal thereof is connected to a positive input of the amplifier 337 through a resistor 345 to provide an offset adjustment.

The output of the amplifier 337 is connected to an anode of a diode 347. The analog heat control signal is provided at a cathode of the diode 347.

The amplifiers 323 and 337 together serve as a differential amplifier which provides the analog heat control signal according to any difference between the analog ramp and temperature signals. If the apparatus is operating in test mode, the value of the analog temperature signal is summed with the ramp signal at the summation point to provide a small heat control signal for test purposes, as already described.

The gain of the amplifier 337 determines the slope of the heat control signal and the offset thereof determines its initial value. Optionally, these parameters can be manually controlled if it is desired to vary them according to the size of the articles to be fused. As indicated by broken lines, a variable resistor 349 is connected through a switch 351 between the variable terminal of the potentiometer 343 and ground to change the offset and thereby the initial value of the heat control signal. Similarly, a variable resistor 353 is connected through a switch 355 across the resistor 339 to change the gain and thereby the amount of increase of the heat control signal which corresponds with a given value of the difference between the analog ramp and temperature signals. The values of the components used in the above-described circuit are not believed to be critical. The following components and component values have been found to provide satisfactory results:

| Ref. No. | Item | Identification or value |
| --- | --- | --- |
| 291 | analog switch | CD4066B bilateral switch; RCA |
| 293 | amplifier | TL071P low noise op amp; Texas Instruments |
| 295 | capacitor | 10 |
| 297 | analog switch | same as #291 above |
| 299 | diode | 1N4148 |
| 301 | resistor | 100K |
| 303 | analog switch | same as #291 above |
| 305 | invert gate | any CMOS gate |
| 307 | resistor | 100K |
| 309 | resistor | 100K |
| 311 | amplifier | LM324AN; National Semiconductor |
| 313 | resistor | 100K |
| 315 | resistor | 100K |
| 317 | amplifier | same as #311 above |
| 319 | resistor | 100K |
| 321 | resistor | 100K |
| 323 | amplifier | same as #311 above |
| 325 | resistor | 100K |
| 327 | resistor | 100K |
| 329 | resistor | 100K |
| 331 | resistor | 4.99K |

-continued

| Ref. No. | Item | Identification or value |
| --- | --- | --- |
| 333 | capacitor | 1.0 |
| 335 | resistor | 4.99K |
| 337 | amplifier | uA759U1C; Fairchild |
| 339 | pot | 30.1K |
| 341 | resistor | 47.5K |
| 343 | pot | 10K |
| 345 | resistor | 10K |
| 347 | diode | 1N4148 |

Figure 8:
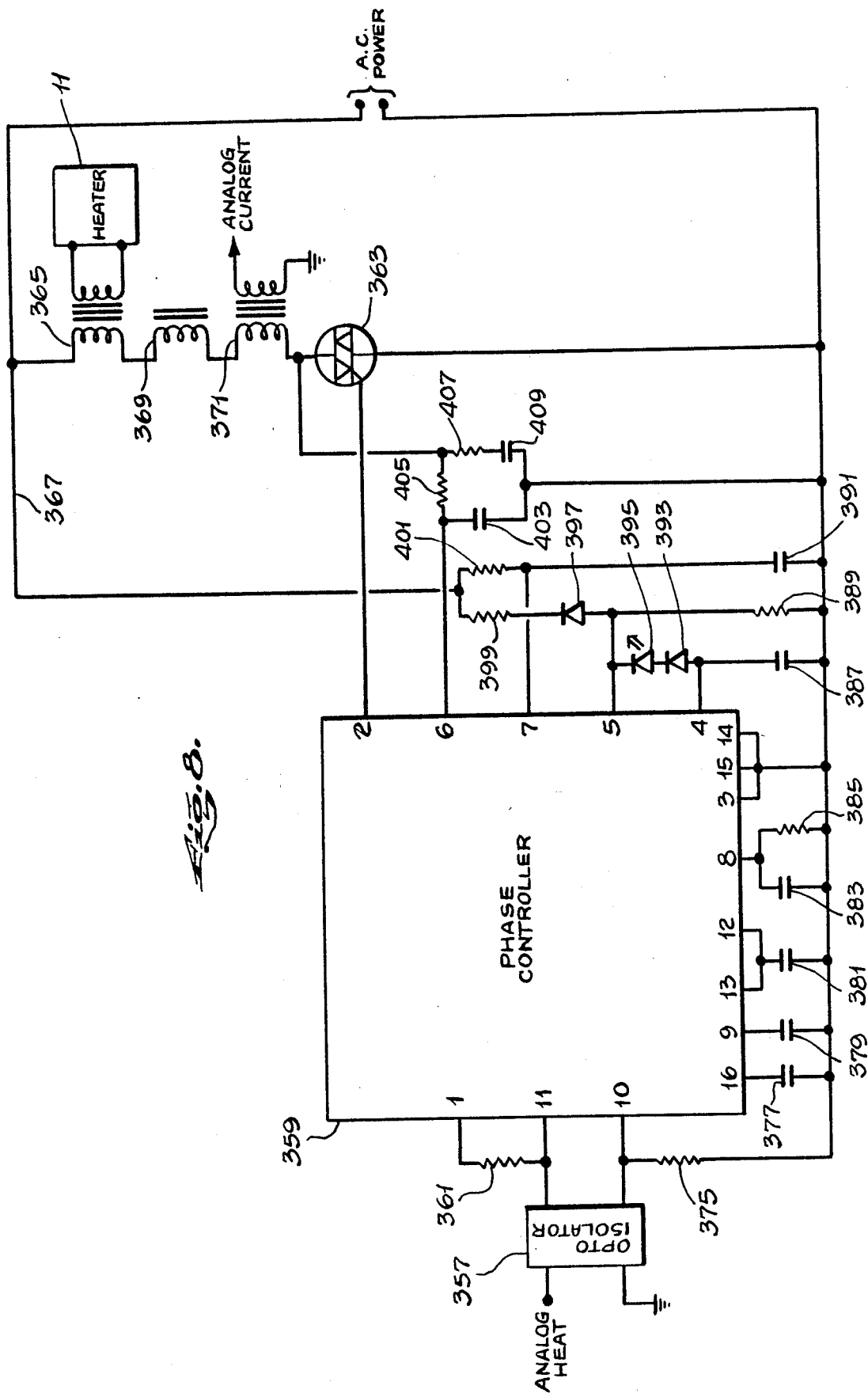
FIG. 8 is a schematic diagram of the "heater control" block of FIG. 1.

The heater control block 37 of FIG. 1 is depicted schematically in FIG. 8. The analog heat control signal is applied to an input of an optical isolator 357 such as a Photomod type CLM3012A. A first output of the isolator 357 is connected to an input pin 11 of a phase controller 359 such as a Plessey Semiconductors type TDA2086.

A second output of the isolator 357 is connected to an input pin 10 of the controller 359. A 220,000 ohm resistor 361 is connected between pins 11 and 1 of the controller 359.

An output pin 2 of the controller 359 is connected to a gate of a TRIAC 363 such as a Teccor 600 volt peak-to-peak, 40 amp TRIAC. A primary of a heater transformer 365 is connected between a first A.C. power supply line 367 and a first terminal of a choke 369. A second terminal of the choke 369 is connected to a first terminal of a primary of a current sense transformer 371 such as a Calcoil type 1125 having a 30 amp primary and a 50 milliamp secondary. A second terminal of the primary of the transformer 371 is connected through the TRIAC 363 to a second A.C. power supply line 373.

A secondary of the current sense transformer 371 provides the analog current signal for the current sense block 51, to be described hereafter.

The choke 369 is a toroidal choke which serves to shape the waveform in the primary of the transformer 365 and to attenuate the rise time.

A secondary of the transformer 365 is connected to the heater coil 11. The transformer 365 must carry a heavy current load and therefore must be physically large enough to provide adequate power to the heater. A 1500 volt-amp 2:1 stepdown transformer having a nominal 54-volt secondary has been found to give satisfactory results.

In operation, the phase controller 359 provides a phase control signal to trigger the TRIAC 363 at any desired phase point during a cycle of alternating power as provided across the A.C. lines 367 and 373. Thus, the analog heat control signal determines the amount of electric power provided to the heater 11 and thusly regulates the amount of heat provided.

Additional components required for proper operation of the phase controller 359 include a 2200 ohm resistor 375 connected between pin 10 and the A.C. line 373; a 47 microfarad capacitor 377 connected between pin 16 and the A.C. line 373; a 0.1 microfarad capacitor 379 connected between pin 9 and the A.C. line 373; a 0.1 microfarad capacitor 381 connected between a junction of pins 12 and 13 and the A.C. line 373; a 1.0 microfarad capacitor 383 in parallel with a 100,000 ohm resistor 385 connected between pin 8 and the A.C. line 373; a 47 microfarad capacitor 387 connected between pin 4 and the A.C. line 373; a 7,800 ohm resistor 389 connected between pin 5 and the A.C. line 373; a 10 nanofarad capacitor 391 connected between pin 7 and the A.C. line 373; an anode of a 1N4004 diode 393 connected to pin 4; a cathode of the diode 393 connected to an anode of a light-emitting diode 395; a cathode of the diode 395 connected to pin 5; an anode of a 1N4004 diode 397 connected to pin 5; a cathode of the diode 397 connected to the A.C. line 367 through a 5,000 ohm resistor 399; a 330,000 ohm resistor 401 connected between pin 7 and the A.C. line 367; a 10 nanofarad capacitor 403 connected between pin 6 and the A.C. line 373; a 330,000 ohm resistor 405 connected between pin 6 and the second terminal of the primary of the transformer 371; a 120 ohm resistor 407 in series with a 0.1 microfarad capacitor 409 connected between the second terminal of the primary of the transformer 371 and the A.C. line 373; and a direction connection between pins 3, 14 and 15 and the A.C. line 373.

The current sense block 51 of FIG. 1 is shown schematically in FIG. 9. The analog current signal is applied to an anode of a diode 411. A cathode of the diode 411 is connected to a first input of an OR gate 413 through a resistor 415. A capacitor 417 and a resistor 419 in parallel are connected between the cathode of the diode 411 and ground. A cathode of a diode 421 is connected to the first input of the gate 413 and an anode of the diode 421 is connected to ground.

The analog current signal is also applied to a positive input of a comparator 423 through a resistor 425. A capacitor 427 is connected between said positive input and ground. An anode of a diode 429, and a cathode of a diode 431, are connected to said positive input, and a cathode of the diode 429 and an anode of the diode 431 are connected to ground. A resistor 433 is connected between a negative input of the comparator 423 and V+, and a resistor 435 is connected between said input and ground.

An output of the comparator 423 is connected to an anode of a diode 437. A resistor 439 is connected between said output and V+, and a resistor 441 is connected across the diode 437. A capacitor 443 is connected between a cathode of the diode 437 and ground. The cathode of the diode 437 is connected to a positive input of a comparator 445. A resistor 447 is connected between a negative input thereof and V+, and a resistor 449 is connected between said negative input and ground.

An output of the comparator 445 is connected to a clock input of a D-type flip-flop 451 through a resistor 453. A resistor 455 is connected between said clock input and V+, and a capacitor 457 is connected between said clock input and ground. A "D" input of the flip-flop 451 is connected to ground. A "set" input of the flip-flop 451 receives the "ramp enable" signal. A "Q" output of the flip-flop 451 is connected to a second input of the gate 413. The heater fault signal is provided at an output of the gate 413.

Before the analog ramp is activated, the ramp enable signal is at a HI level, thereby setting the Q output of the flip-flop 451 to a HI level. This in turn causes the heater fault signal to also go to a HI level, indicating normal operation. When the ramp enable signal goes LO, indicating that fusion has begun, the flip-flop 451 is rendered responsive to its clock input. Any abrupt fall in the level of the heater current thereafter will clock the flip-flop, setting the Q output to a LO level. Thereafter, a lack of current flow as indicated by a LO level at the second input of the gate 413 will result in a heater fault signal being provided as a LO level output from the gate 413. Thus, both conditions: a drop in heater current and an absence of heater current, must occur in order to trigger a heater fault signal. This prevents a heater fault from being indicated merely by an absence of heater current, a condition which is normal until the analog ramp signal exceeds the analog temperature signal during the fusion process.

The values of the components used in the above-described circuit are not believed to be critical. The following components and component values have been found to provide satisfactory results:

| Ref. No. | Item | Identification or value |
| --- | --- | --- |
| 411 | diode | 1N4007 |
| 413 | gate OR gate; | RCA type CD4071 |
| 415 | resistor | 10K |
| 417 | capacitor | 4.7 |
| 419 | resistor | 22K |
| 421 | diode | 1N4740 |
| 423 | comparator | LM339AN; National Semiconductor |
| 425 | resistor | 33K |
| 427 | capacitor | 47 nanofarad |
| 429 | diode | 1N914 |
| 431 | diode | 1N914 |
| 433 | resistor | 12K |
| 435 | resistor | 100 |
| 437 | diode | 1N914 |
| 439 | resistor | 12K |
| 441 | resistor | 22K |
| 443 | capacitor | 4.7 |
| 445 | comparator | same as #423 above |
| 447 | resistor | 10K |
| 449 | resistor | 2K |
| 451 | flip-flop | RCA type CD4013B |
| 453 | resistor | 100 |
| 455 | resistor | 180K |
| 457 | capacitor | 22 |

Figure 10:
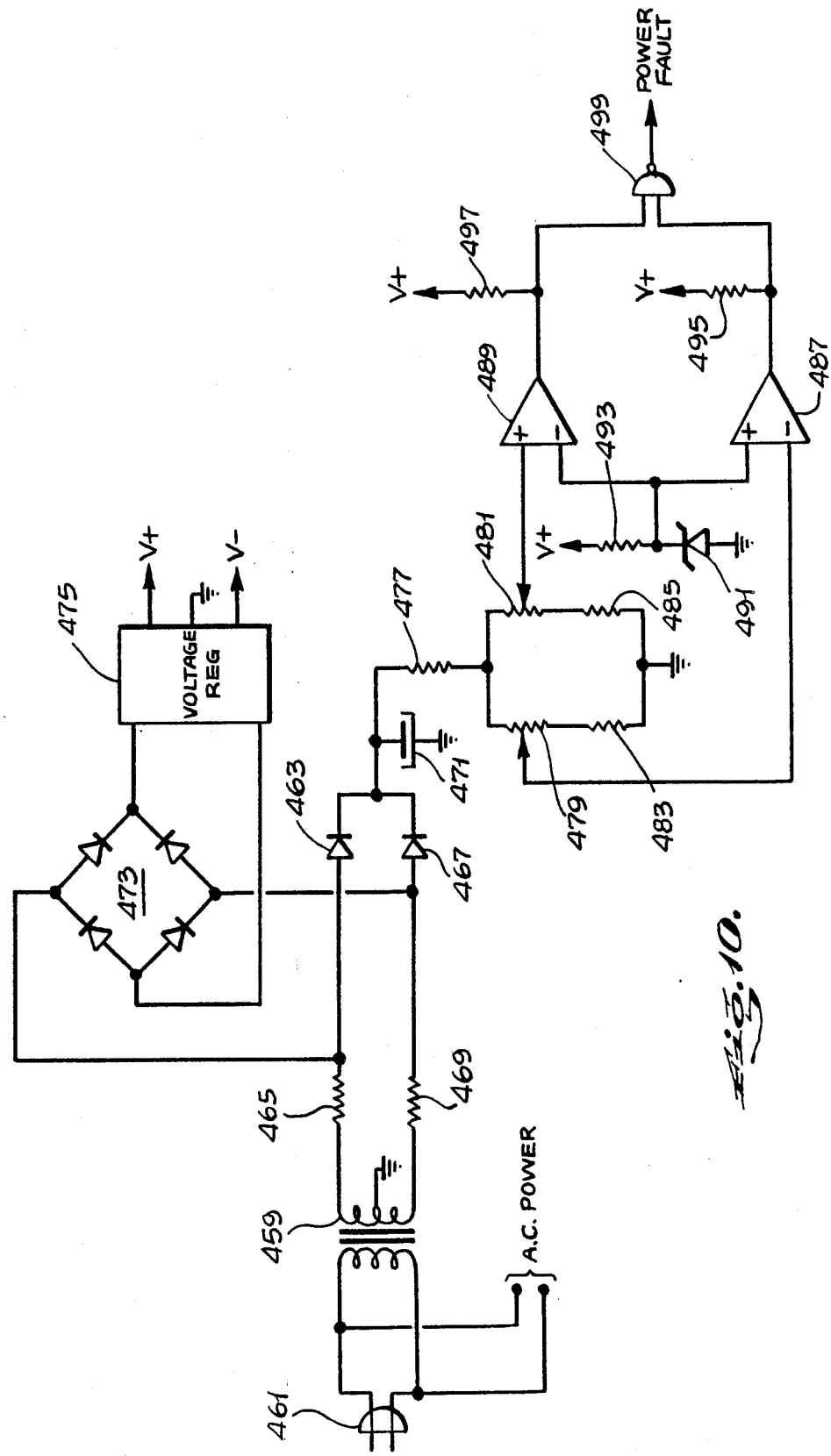
FIG. 10 is a schematic diagram of the "power supply" and "voltage sense" blocks of FIG. 1.

The voltage sense and power supply blocks 57 and 61 of FIG. 1 are shown schematically in FIG. 10. A.C. line power is received at a primary of a power transformer 459 through a connector 461. A first terminal of a secondary of the transformer 461 is connected to an anode of a diode 463 through a resistor 465, and a second terminal of the secondary is connected to an anode of a diode 467 through a resistor 469. A center tap of the secondary of the transformer 459 is connected to ground. Cathodes of the diodes 463 and 467 are connected together to define a full-wave rectifier. A filter capacitor 471 is connected between the cathodes and ground.

A full-wave bridge rectifier 473 is connected between the anodes of the diodes 463 and 467 and to a voltage regulator 475 of conventional design. The voltage regulator 475 provides V+ and V− output voltages to power the previously-described circuits. Values of +12 and −12 volts have been found to be satisfactory.

The full-wave rectifier defined by the diodes 463 and 467 provides an unregulated voltage which is proportional to the A.C. input voltage. Hence, if the A.C. input voltage goes too high or too low, this will be reflected in a proportional change in the voltage from the diodes 463 and 467. The balance of the circuit monitors the voltage from the diodes 463 and 467 and provides the power fault signal if that voltage becomes too high or too low, indicating unacceptable fluctuations in the A.C. power line voltage.

The cathodes of the diodes 463 and 467 are connected through a resistor 477 to first fixed terminals of potentiometers 479 and 481. Second fixed terminals of said potentiometers are connected to ground through resistors 483 and 485, respectively. A variable terminal of the potentiometer 479 is connected to a negative input of a comparator 487, and a variable terminal of the potentiometer 481 is connected to a positive input of a comparator 489. A negative input of the comparator 487 and a positive input of the comparator 498 are connected to a cathode of a Zener diode 491 and through a resistor 493 to V+. An anode of the Zener diode is connected to ground. A resistor 495 is connected from an output of the comparator 487 to V+, and a resistor 497 is connected from an output of the comparator 489 to V+. The outputs of the comparators are connected to inputs of a NAND gate 499. The power fault signal is provided at an output of the gate 499.

In operation, if the voltage at the cathodes of the diodes 463 and 467 becomes either too high or too low with respect to a reference voltage developed across the Zener diode 491, one of the comparators 487 and 489 provides an output signal which causes the output of the NAND gate 499 to go LO, thereby indicating a power fault.

The values of the components used in the above-described circuit are not believed to be critical. The following components and component values have been found to provide satisfactory results:

| Ref. No. | Item | Identification or value |
|---|---|---|
| 463 | diode | 1N4002 |
| 465 | resistor | 0.22 ohm |
| 467 | diode | 1N4002 |
| 469 | resistor | 0.22 ohm |
| 471 | capacitor | 4.7 |
| 477 | resistor | 15K |
| 479 | pot | 10K |
| 481 | pot | 9.1K |
| 483 | resistor | 9.1 K |
| 485 | resistor | 7.32K |
| 487 | comparator | LM339AN; National Semiconductor |
| 489 | comparator | same as #487 above |
| 491 | 6.9 v Zener | LM329; National Semiconductor |
| 493 | resistor | 2K |
| 495 | resistor | 12K |
| 497 | resistor | 12K |

From the foregoing it will be appreciated that the method and apparatus of the invention provide a way to fuse thermoplastic materials by the controlled application of heat to attain fusion temperature throughout the interface between the materials substantially simultaneously. This fusion temperature is attained regardless of the ambient temperature and without the occurrence of hot spots, melting of the materials, or incomplete fusion, thereby resulting in consistently superior, mechanically strong, leak-proof connections between the fused articles.

Although certain specific embodiments of the invention have been described and illustrated, the invention is not to be limited to the specific forms or arrangements of parts so described and illustrated, and various modifications and changes can be made without departing from the scope and spirit of the invention. Within the scope of the appended claims, therefore, the invention may be practiced otherwise than as specifically described and illustrated.

I claim:

1. A pipeline forming system, comprising in combination:

lengths of thermoplastic pipe having ends of uniform size;

a thermoplastic collar containing a heating element responsive to a control signal therein and sized to receive the ends of two abutting lengths of pipe;

sensor means operative to provide a sensed temperature signal corresponding to the temperature at the pipe/collar interface;

generator means operative to provide a desired temperature signal non-repetitiously increasing at a preselected rate from what corresponds to a subambient temperature up to a temperature sufficient to fuse the pipe and collar together;

differential means operative to provide a control signal for said heating element corresponding to the magnitude of desired temperature signal over the magnitude of said sensed temperature signal whereby heat is gradually applied to such interface so as to raise its temperature uniformly.

2. Pipeline forming system according to claim 1 wherein the desired temperature signal comprises a ramp signal.

3. Pipeline forming system according to claim 1 and further comprising adjustment means operative to adjust the control signal according to the size of the pipe to be fused.

4. Pipeline forming system according to claim 1 and further comprising fault detection means operative to monitor the sensor means and the heating element during fusion and to terminate the fusion if a fault is detected.

5. Pipeline forming system according to claim 4 wherein electric power is supplied from an external source and wherein the fault detection means is operative to monitor the current during fusion and to terminate the fusion if a power fault is detected.

6. Pipeline forming system according to claim 1 and further comprising test means operative to test the sensor means and the heating element for proper operation prior to commencement of the fusion.

7. A method of fusing a pipe end and a collar, each made of thermoplastic material by applying heat to the interface between the pipe end and collar, the method comprising:

sensing the temperatures at the interface and providing a sensed temperature signal corresponding with the temperature;

generating a desired temperature signal corresponding with a predetermined heat application rate which causes the temperature at substantially all portions of the interface to rise substantially uniformly;

providing a heat control signal corresponding with any difference between the sensed and desired temperature signals; and applying heat to the interface at a rate determined by the heat control signal whereby fusion temperature is attained throughout the interface substantially simultaneously.

8. A method according to claim 7 wherein the desired temperature signal comprises a ramp signal.

9. A method according to claim 7 and further comprising monitoring the temperature sensing and application of heat during the fusion and terminating the fusion if a fault is detected.

10. A method according to claim 7 and further comprising monitoring electric current received from an external source and terminating the fusion if a power fault is detected.

11. A method according to claim 7 and further comprising testing for proper temperature sensing and application of heat prior to commencement of the fusion.

* * * * *